(12) United States Patent
Stanton et al.

(10) Patent No.: US 6,905,216 B2
(45) Date of Patent: Jun. 14, 2005

(54) METHOD OF AND DEVICE FOR GENERATING AN IMAGE HAVING A DESIRED BRIGHTNESS

(75) Inventors: Douglas A. Stanton, Briarcliff, NY (US); Martinus V. C. Stroomer, Eindhoven (NL); Adrianus J. S. M. De Vaan, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/643,245

(22) Filed: Aug. 18, 2003

(65) Prior Publication Data

US 2004/0051851 A1 Mar. 18, 2004

Related U.S. Application Data

(63) Continuation of application No. 09/389,177, filed on Sep. 2, 1999, now Pat. No. 6,631,995.

(51) Int. Cl.[7] .................... G03B 21/14; G03B 21/20
(52) U.S. Cl. .................... 353/84; 353/85; 353/97
(58) Field of Search .................. 353/5, 7, 8, 18, 353/84, 85, 97, 122, 199; 349/5, 7, 8, 18, 199; 345/690

(56) References Cited

U.S. PATENT DOCUMENTS

| 5,597,223 | A | | 1/1997 | Watanabe et al. ............. 353/97 |
| 5,622,418 | A | | 4/1997 | Daijogo et al. ............... 353/97 |
| 5,675,391 | A | * | 10/1997 | Yamaguchi et al. ......... 348/565 |
| 5,717,422 | A | | 2/1998 | Fergason ..................... 345/102 |
| 5,806,950 | A | * | 9/1998 | Gale et al. ..................... 353/78 |

* cited by examiner

*Primary Examiner*—Arthur A Smith

(57) ABSTRACT

The present invention relates to a method of generating an image having a desired brightness, which image is generated by means of a device provided with at least one light source, at least one electro-optical light modulation panel and at least one light-control device. The light from the light source is converted into an image having a desired brightness via at least the electro-optical light modulation panel and the light-control device. The image to be projected is analyzed in a regulator, whereafter the electro-optical light modulation panel and the light-control device are driven, while a too bright image is generated by means of the electro-optical light modulation panel, which image is converted by means of the light-control device into an image having a desired brightness and a desired contrast.

12 Claims, 3 Drawing Sheets

METHOD OF AND DEVICE FOR GENERATING AN IMAGE HAVING A DESIRED BRIGHTNESS

This is a continuation of Ser. No. 09/389,177 filed on Sep. 2, 1999, now U.S. Pat. No. 6,631,995.

The invention relates to a method of generating an image having a desired brightness, which image is generated by means of a device comprising at least one light source, at least one electro-optical light modulation panel and at least one light-control device, the light from the light source being converted into an image having a desired brightness via at least the electro-optical light modulation panel and the light-control device.

The invention also relates to a device which is suitable for generating an image having a desired brightness by means of such a method, which device comprises at least one light source, at least one electro-optical light modulation panel and at least one light-control device.

In such a method and device known from U.S. Pat. No. 5,597,223, the light-control device comprises a diaphragm having an adjustable aperture. The device is applicable in a light or a dark ambience, with the aperture size being adjusted in dependence upon a light or a dark ambience, such that bright images or images which are rich in contrast are accentuated.

However, the aperture size is not optimized for each image. When, for example, an LCD is used as an electro-optical light modulation panel, the contrast in an image is directly dependent on the desired brightness of this image. When an image to be projected has a relatively low brightness, the LCD is driven accordingly. At a desired, relatively low brightness, the realized contrast is relatively low due to physical properties of the LCD. Consequently, the contrast that can be maximally realized with the LCD cannot be achieved at a desired, relatively low brightness.

It is an object of the invention to provide a method and a device with which a desired brightness and a desired contrast can be realized for each image.

In the method according to the invention, this object is achieved in that the image to be projected is analyzed in a regulator, whereafter the electro-optical light modulation panel and the light-control device are driven, and a too bright image is generated by means of the electro-optical light modulation panel, which image is converted by means of the light-control device into an image having a desired brightness and a desired contrast.

By analyzing preferably each image prior to driving the electro-optical light modulation panel, the light modulation panel can be subsequently driven in such a way that a too bright image having a desired contrast is generated by means of this panel. Simultaneously, the light-control device, which comprises, for example, a diaphragm or a light modulation panel, is driven in such a way that the image generated by means of the light modulation panel and the light-control device has both the desired contrast and the desired brightness.

In the device according to the invention, the object is achieved in that the device comprises a regulator for analyzing the image to be projected, driving the electro-optical light modulation panel for generating a too bright image, and driving the light-control device for converting the too bright image into an image having a desired brightness and a desired contrast.

By driving the light modulation panel as maximally as possible, a maximal brightness and thus a maximal contrast is obtained. The brightness is reduced to the desired level by means of the light-control device.

For an image having large dark areas and large highlights areas, the dark areas can be made perceptually darker by generating a too dark image by the panel, and converting the image into one having the desired brightness and contrast by using the light control device to increase light from the light source.

An embodiment of the device according to the invention is characterized in that the device comprises at least two electro-optical light modulation panels and one light-control device, by means of which images generated on the light modulation panels are simultaneously convertible.

Each light modulation panel is applicable for a different color of the images to be projected. Since each light modulation panel is associated with a light-control device, the light modulation panel can be optimally driven separately for each color by means of the regulator.

These and other aspects of the invention are apparent from and will be elucidated with reference to the embodiments described hereinafter.

In the drawings.

Corresponding components in the Figures are denoted by the same reference numerals.

Figure 1:
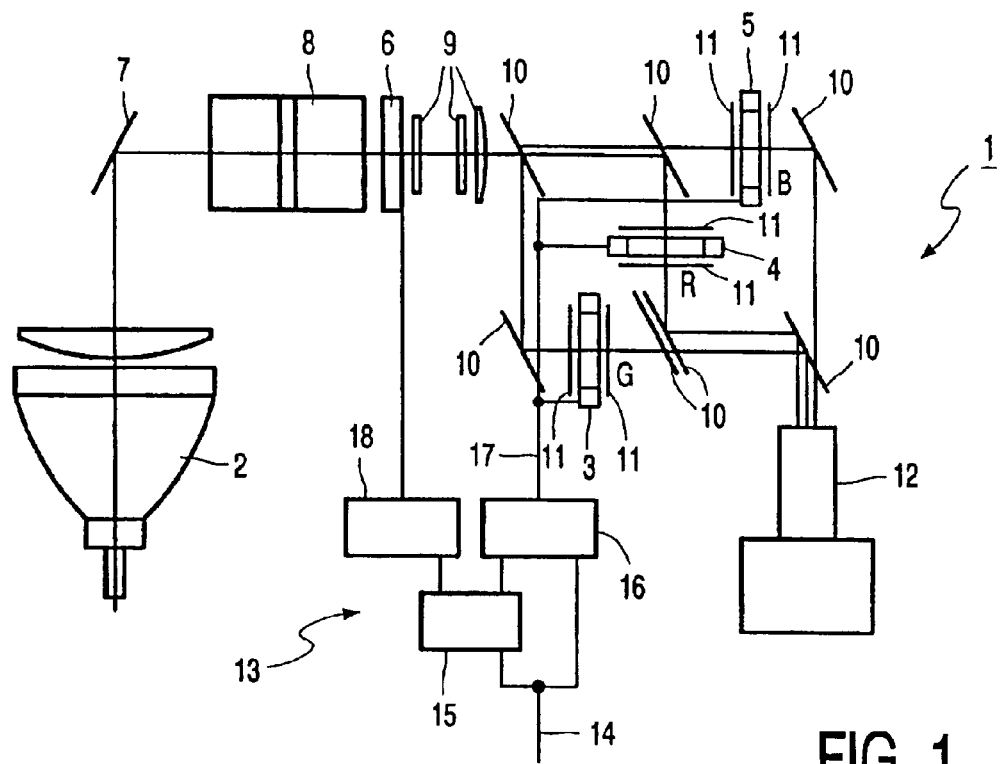
FIG. 1 shows a first embodiment of a device according to the invention.

FIG. 1 shows a device 1 according to the invention, comprising a light source 2, three electro-optical light modulation panels 3, 4, 5 with which a green G, a red R and a blue B part, respectively, of an image to be projected is realized, and a light-control device 6 arranged between the light source 2 and the light modulation panels 3–5. A folding mirror 7 and a PBS 8 (Polarizing Beam Splitter) are arranged between the light source 2 and the light-control device 6. The light-control device 6 may be a diaphragm, but in the embodiment shown here, the light-control device is provided with a twisted nematic cell having a polarizer at an exit side. Lenses 9, (dichroic) folding mirrors 10 and polarization filters 11 are arranged between the light-control device 6 and the light modulation panels 3–5. The lenses 9, (dichroic) folding mirrors 10 and filters 11 are known per se and will therefore not be described in greater detail. The device 1 further comprises a projection lens 12. Filters 11 and (dichroic) folding mirrors 10 are also arranged between the light modulation panels 3–5 and the projection lens 12.

The device 1 further comprises a regulator 13. The regulator 13 has a video signal input 14 which is connected to a video signal analyzer 15 and to a video signal amplifier 16. The video signal analyzer 15 is also connected to the video signal amplifier 16. The video signal amplifier 16 has a video signal line 17 which is also connected to the light modulation panels 3–5. The regulator 13 further comprises a drive module 18 which is arranged between the video signal analyzer 15 and the light-control device 6.

The operation of the device 1 will now be briefly elucidated. The video signal input 14 supplies the information about the images to be projected to the regulator 13. This information is analyzed in the video signal analyzer 15, determining the desired brightness and the desired contrast of the complete image or of parts of the image. Subsequently, the video signal analyzer 15 drives the video signal amplifier 16 and the drive module 18 which in their turn drive the light modulation panels 3–5 and the light-control device 6, respectively.

The video signal amplifier 16 drives the light modulation panels 3–5 in such a way that, in the absence of the light-control device 6, an image would be obtained which would have a too high brightness. However, the contrast of such an image would have a desired value. The drive module 18 drives the light-control device 6 completely or for each part of the image to be projected, such that the brightness of the projected image corresponds to the desired brightness. The regulator 13 is preferably based on statistic information relating to the amplitude range of the video signal.

Figure 2:
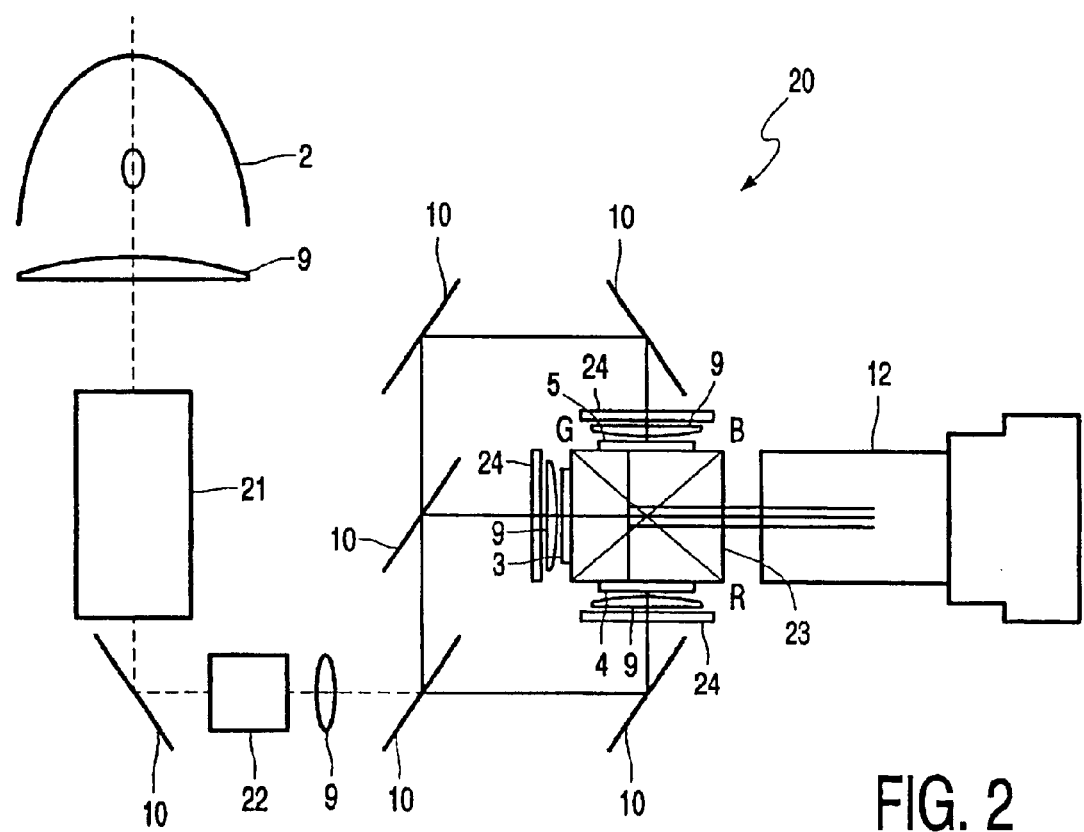
FIG. 2 shows a second embodiment of a device according to the invention.

FIG. 2 shows a device 20 according to the invention, comprising a light source 2, light modulation panels 3–5 and a projection lens 12. The device 20 further comprises lenses 9, (dichroic) folding mirrors 10, a PCS 21 and an integrator 22, arranged between the light source 2 and the light modulation panels 3–5. The device 20 further comprises a dichroic prism 23 arranged between the light modulation panels 3–5 and the projection lens 12. Moreover, the device 20 comprises three light-control devices 24 arranged on a side of the light modulation panels 3–5 remote from the prism 23. The light-control devices 24 and the light modulation panels 3–5 can be driven by means of a regulator, such that, per color green G, red R and blue B, the associated light modulation panel 3–5 is driven in such a way that a too bright image having a desired contrast is obtained, which image is converted by means of the associated light-control devices 24 into an image having a desired brightness.

Figure 3:
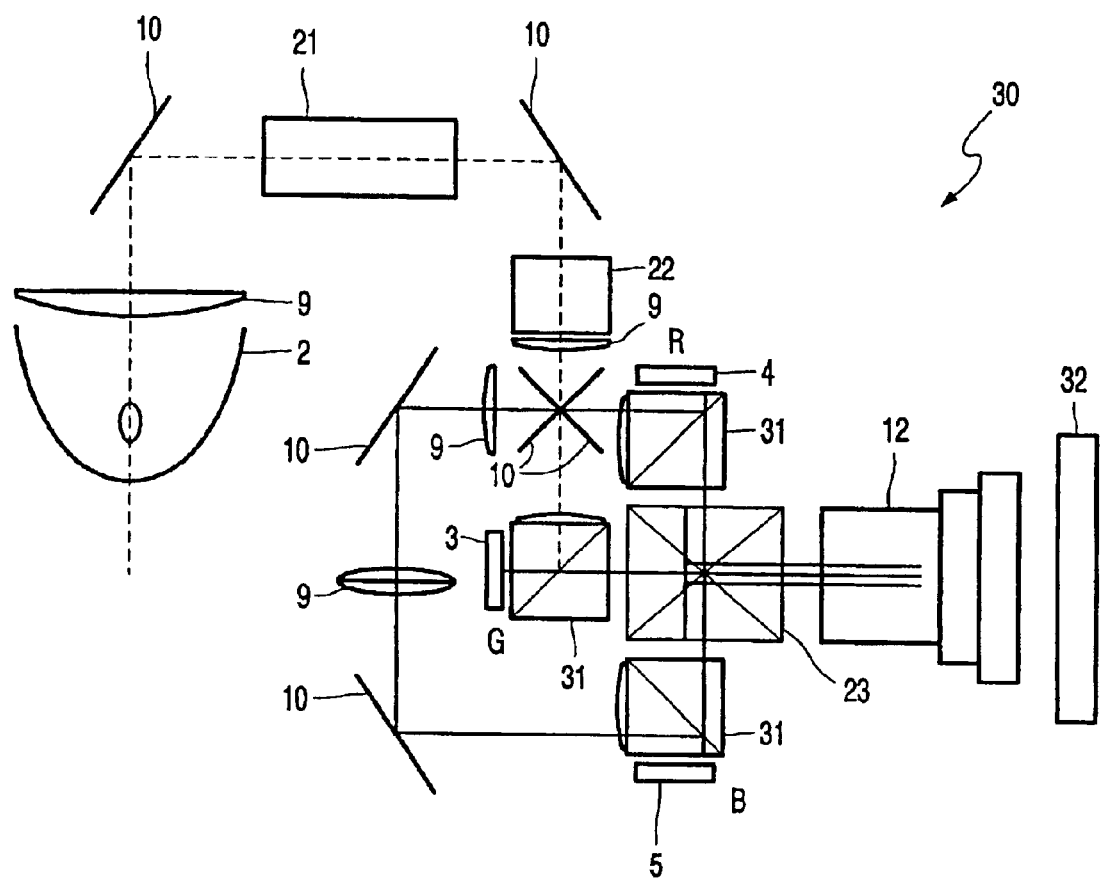
FIG. 3 shows a third embodiment of a device according to the invention.

FIG. 3 shows a third embodiment of a device 30 according to the invention, comprising a light source 2, reflective light modulation panels 3–5 and a projection lens 12. The device further comprises lenses 9, (dichroic) folding mirrors 10, a PCS 21, an integrator 22 and polarizing beam splitters 31, arranged between the light source 2 and the light modulation panels 3–5. The polarizing beam splitters 31 and the dichroic prism 23 are arranged between the light modulation panels 3–5 and the projection lens 12. The device 30 further comprises a liquid-crystal shutter 32 which can be controlled separately for each of the three colors and is arranged on a side of the projection lens 12 remote from the light modulation panels 3–5. Also in the device 30 shown in this embodiment, the light modulation panels 3–5 are driven at a brightness which is relatively too high, whereafter the desired brightness of the image to be projected is generated per color by means of the shutter 32 operating as a light-control device.

Although not mentioned in the description of FIGS. 1 and 2, both embodiments may be provided with an integrator arranged between the light source 2 and the PBS 8.

It is alternatively possible to use the method and the device in systems which are not provided with a projection lens 12.

Dependent on the desired quality of the images to be projected, the light-control device can influence the brightness of the image in its totality, or it can influence the brightness of parts of the image to be projected. As smaller parts of the image can be influenced by the light-control device, a higher quality of the image to be projected can be realized.

It is alternatively possible to provide a light source drive unit as a light-control device, by means of which the brightness of the light source can be controlled per image. Light sources which do not require a constant power level are, for example, Xenon arc lamps and LEDs.

All embodiments described up to now show a device comprising three light valves 3–5. However, it is possible to have a device comprising only one light modulation panel, monochrome or color. A color single light modulation panel can for example by illuminated color sequentially by means of a color wheel, by scrolling bars or by means of three differently colored lamps. In case of a color wheel or three different light sources, the image can be influenced for each color independently. Namely, the segments in the color wheel or the time that each of the lamps is lit can be varied for each color. In case of scrolling bars, it is more difficult to influence the intensity of the colors in the image independently as the panel is illuminated by two bars simultaneously.

When the device comprises three light modulation panels and one light source, independent control of the intensity of the colors in the image is not possible. When the intensity of the light source is changed, the three colors will be influenced simultaneously.

Figure 4:
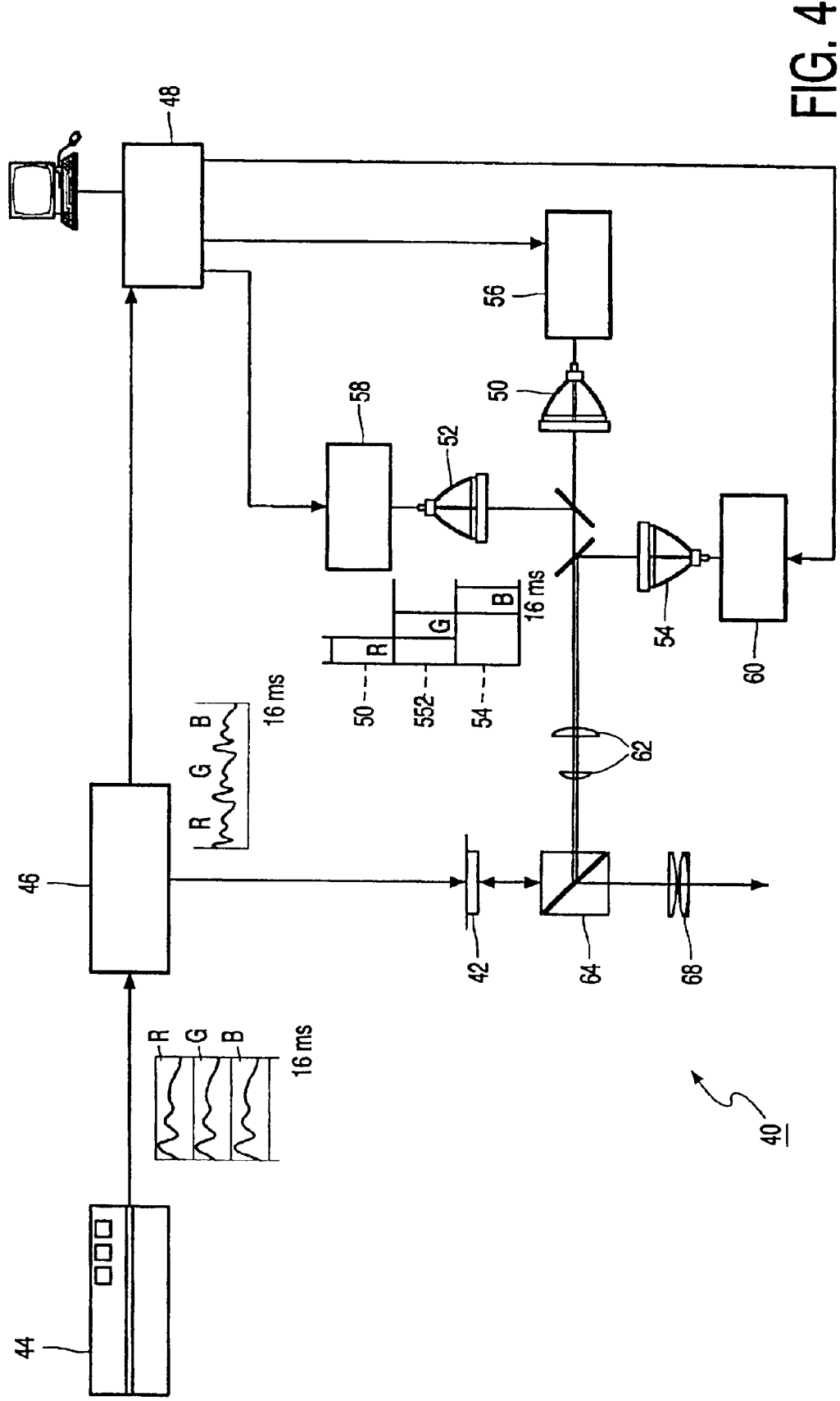
FIG. 4 shows a fourth embodiment of a device according to the invention comprising one color single light modulation panel of the reflective type.

Another embodiment in which independent control for each color is possible is shown in FIG. 4.

FIG. 4 shows an embodiment of a device 40 according to the invention comprising one single light modulation panel 42 of the reflective type. Said panel can be for example a reflective LCD-panel or a DMD-panel. Image information to be projected is provided from a video source 44 via projector electronics 46 to the panel 42, on the one hand, and to a light source controlling device 48, on the other hand, for synchronization. The light source comprises three different lamps 50, 52 and 54, one for each primary color. The light source controlling device 48 is connected to a programmable power supply 56, 58, 60 for the lamps 50, 52 and 54. Via lenses 62 and a prism illuminator 64, the light from the light source is incident on the light valve 42. The prism illumination 42 may be a PBS in case the light valve is an LCD panel and may be a prism based on TIR in case the light valve is a DMD. After modulation by the light valve 42, the light to be projected reaches the projection lens 68. By flashing each of the lamps in a time interval of, for example 16 ms, as is indicated in the inset, and by varying the time interval for the individual lamps, the colors can be varied independently in the image to be projected. The video data to be projected for each color are field sequentially provided to the light modulation panel.

What is claimed is:

1. A method of generating a desired image, comprising:
analyzing a first image to determine a desired brightness and a desired contrast for said first image;
providing an illumination beam from a constant intensity light source;
modulating said illumination beam to produce an image beam having said desired contrast; and
optically adjusting a one of said illumination beam and said image beam to form said desired image having said desired brightness.

2. The method as claimed in claim 1, wherein the analyzing is performed by a regulator.

3. The method as claimed in claim 1, wherein the step of modulating is performed by a light modulator panel.

4. The method as claimed in claim 1, wherein the step of optically adjusting is performed by a light control device.

5. The method as claimed in claim 1, wherein a brightness and a contrast of said desired image are adjusted substantially independently of each other.

6. The method as claimed in claim 1, wherein a contrast of said desired image is independent from a background illumination level.

7. The method of claim 1, wherein
the first image does not cover a complete range of gray levels producible by an image processing apparatus performing said step of modulating;

the image beam covers a larger range of gray levels than the first image, while being within said complete range; and whereby, the desired image has the larger range of gray levels with the desired brightness.

8. The method of claim 7, wherein the image processing apparatus comprises at least one light modulation panel and wherein the image beam comprises image modulation information within the at least one modulation panel.

9. The method of claim 7, wherein the step of modulating results in a brightness level that causes the image beam to lie within parameters achieving a maximum dynamic range of at least a portion of the image processing apparatus.

10. The method of claim 9, wherein the step of optically adjusting relates to a second portion of the image proceasing apparatus.

11. A method for producing an output image in a device comprising a constant intensity light source and at least one light modulator, the output image resulting from passing light from the constant intensity light source through the light modulator, the method comprising:

analyzing an input image to derive a desired contrast and desired brightness;

adjusting the light modulator to a setting which would normally not result in the desired brightness, but would result in the desired contrast;

optically adjusting the brightness of the output image to retain the desired contrast achieved by the light modulator while attaining the desired brightness.

12. An image producing device comprising:

a video input;

at least one constant intensity light source, having a given normal brightness value;

at least one light modulator, responsive to the video input for adding image data from the video input to light from the light source;

means for analyzing the video input to derive a desired contrast and a desired brightness;

supplying at least one first control signal to cause the light modulator to be adjusted to achieve the desired contrast, but a brightness other than the desired brightness with the constant intensity light source at the given normal brightness value;

supplying at least one second control signal to cause an optical brightness adjustment in order to achieve the desired brightness in the output image in view of the adjustment of the light modulator; so that the output image has both the desired contrast and the desired brightness.

* * * * *